United States Patent
Kobayashi et al.

(10) Patent No.: US 9,028,363 B2
(45) Date of Patent: May 12, 2015

(54) CONTROL DEVICE FOR HYBRID VEHICLE

(75) Inventors: Nobufusa Kobayashi, Anjo (JP); Toshio Sugimura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/365,358

(22) PCT Filed: Dec. 14, 2011

(86) PCT No.: PCT/JP2011/078965
§ 371 (c)(1),
(2), (4) Date: Jun. 13, 2014

(87) PCT Pub. No.: WO2013/088536
PCT Pub. Date: Jun. 20, 2013

(65) Prior Publication Data
US 2014/0379232 A1   Dec. 25, 2014

(51) Int. Cl.
B60W 10/08 (2006.01)
B60W 20/00 (2006.01)
B60K 6/48 (2007.10)
B60K 6/547 (2007.10)
B60W 10/06 (2006.01)

(52) U.S. Cl.
CPC ............... *B60W 20/40* (2013.01); *B60K 6/48* (2013.01); *B60K 6/547* (2013.01); *B60W 10/08* (2013.01); *Y02T 10/6221* (2013.01); *B60W 10/06* (2013.01); *B60W 2510/1005* (2013.01); *B60W 2710/083* (2013.01); *F16H 2200/2082* (2013.01); *Y02T 10/6286* (2013.01)

(58) Field of Classification Search
None
See application file for complete search history.

(56) References Cited

FOREIGN PATENT DOCUMENTS

| JP | 2002-027611 A | 1/2002 |
|----|---------------|--------|
| JP | 2008-280968 A | 11/2008 |

*Primary Examiner* — Dirk Wright
(74) *Attorney, Agent, or Firm* — Gifford, Krass, Sprinkle, Anderson & Citkowski, P.C.

(57) ABSTRACT

A control device of a hybrid vehicle includes an engine, an electric motor outputting power for running and power necessary for starting the engine, a connecting/disconnecting clutch connecting/disconnecting a power transmission path between the engine and the electric motor, and an automatic transmission making up a portion of a power transmission path between the electric motor and drive wheels, the automatic transmission having a plurality of gear stages alternatively formed including a gear stage using a one-way clutch as an engaged engagement element, the control device of a hybrid vehicle engages the connecting/disconnecting clutch to start the engine during motor running for running by using only the electric motor with the connecting/disconnecting clutch released.

6 Claims, 6 Drawing Sheets

|     | C1 | C2 | C3 | B1 | B2 | OWC |
|-----|----|----|----|----|----|-----|
| 1st | O  |    |    |    |    | O   |
| 2nd | O  |    |    | O  |    |     |
| 3rd | O  | O  |    |    |    |     |
| 4th |    | O  |    | O  |    |     |
| Rev |    |    | O  |    | O  |     |
| N   |    |    |    |    |    |     |

CONTROL DEVICE FOR HYBRID VEHICLE

TECHNICAL FIELD

The present invention relates to a control device of a hybrid vehicle including an engine and an electric motor, a connecting/disconnecting clutch connecting/disconnecting a power transmission path between the engine and the electric motor, and an automatic transmission between the electric motor and drive wheels.

BACKGROUND ART

A hybrid vehicle is well known that includes an engine, an electric motor capable of outputting power for running and power necessary for starting the engine, and a connecting/disconnecting clutch connecting/disconnecting a power transmission path between the engine and the electric motor. For example, this corresponds to a hybrid vehicle described in Patent Document 1. Such a hybrid vehicle is generally capable of starting the engine by rotationally driving the engine with the electric motor. For example, in a technique proposed in Patent Document 1, when the engine is started with the electric motor during motor running (EV running) for running with only the electric motor used as a drive force source for running, an electric motor torque is increased by a torque capacity of the connecting/disconnecting clutch relative to a drive torque (i.e., by an electric motor torque going toward the engine via the connecting/disconnecting clutch as a torque rotationally driving the engine) so as to prevent temporary insufficiency of the drive torque during running and a shock caused thereby.

PRIOR ART DOCUMENTS

Patent Documents

Patent Document 1: Japanese Laid-Open Patent Publication No. 2002-27611
Patent Document 2: Japanese Laid-Open Patent Publication No. 2008-280968

SUMMARY OF THE INVENTION

Problem to be Solved by the Invention

It is desirable to increase a torque capacity of a connecting/disconnecting clutch by a torque necessary for rotationally driving an engine at the engine start and to increase an electric motor torque by the torque capacity in terms of reduction in energy consumption at the engine start. Although an actual value of the torque capacity of the connecting/disconnecting clutch is estimated from, for example, an engagement pressure command value of the connecting/disconnecting clutch, a slight gap may be generated between an actual value and an estimated value of the torque capacity because of accuracy of control. Therefore, for example, if an increment of the electric motor torque is set based on the estimated value of the torque capacity of the connecting/disconnecting clutch (or the engagement pressure command value of the connecting/disconnecting clutch), the same gap may be generated between the actual value of the torque capacity and the increment of the electric motor torque. On the other hand, a vehicle is well known that further includes a transmission on the subsequent stage of the electric motor (e.g., an automatic transmission such as a planetary gear type multistage transmission having a plurality of alternatively formed gear stages including a gear stage using a one-way clutch as an engaged engagement element) like a vehicle described in Patent Document 1. If the gap described above is generated in a vehicle including such an automatic transmission at the engine start at the gear stage using the one-way clutch as an engaged engagement element and an increment of the electric motor torque is made smaller than the actual value of the torque capacity of the connecting/disconnecting clutch, a drive torque drops and a phenomenon may occur in which the one-way clutch is disengaged and then re-engaged. As a result, at the engine start at the gear stage using the one-way clutch as an engaged engagement element, an occurrence of a synchronization shock of the one-way clutch may tend to increase a shock associated with the engine start as compared to the engine start at a gear stage not using the one-way clutch as an engaged engagement element. The problem described above is unknown and no proposal has hitherto been made on suppressing an increase in energy consumption due to further enlarging an increment of the electric motor torque in anticipation of the gap described above and suppressing the shock associated with the engine start.

The present invention was conceived in view of the situations and it is therefore an object of the present invention to provide a control device of a hybrid vehicle capable of satisfying both suppression of deterioration in fuel efficiency and suppression of a shock when an engine is started.

Means for Solving the Problem

To achieve the object, the first aspect of the invention provides (a) a control device of a hybrid vehicle including an engine, an electric motor outputting power for running and power necessary for starting the engine, a connecting/disconnecting clutch connecting/disconnecting a power transmission path between the engine and the electric motor, and an automatic transmission making up a portion of a power transmission path between the electric motor and drive wheels, the automatic transmission having a plurality of gear stages alternatively formed including a gear stage using a one-way clutch as an engaged engagement element, the control device of a hybrid vehicle engaging the connecting/disconnecting clutch to start the engine during motor running for running by using only the electric motor with the connecting/disconnecting clutch released, wherein (b) when a gear stage at the time of starting the engine uses the one-way clutch as an engaged engagement element, an increment of output of the electric motor at the engine start is made larger as compared to when the gear stage does not use the one-way clutch as an engaged engagement element.

Effects of the Invention

Consequently, although if the increment of output of the electric motor at the engine start is made larger at all the gear stages, an increase in electric power consumption (energy consumption) deteriorates fuel efficiency, the increment of output of the electric motor at the engine start is made larger only at the gear stage at which the increment of output of the electric motor really needs to be made larger (i.e., only at gear stage of the automatic transmission at which a shock associated with the engine start tends to increase because the one-way clutch is used as an engaged engagement element) so as to suppress or prevent the release of the one-way clutch, thereby satisfying both the suppression of deterioration in fuel efficiency and the suppression of a shock at the time of the engine start.

The second aspect of the invention provides the control device of a hybrid vehicle recited in the first aspect of the invention, wherein during running at the gear stage using the one-way clutch as an engaged engagement element, a range of performing the motor running is made smaller as compared to during running at the gear stage not using the one-way clutch as an engaged engagement element. Consequently, during the motor running at the gear stage using the one-way clutch as an engaged engagement element, the power usable for vehicle drive is made smaller in the power that can be output by the electric motor and the power usable for the engine start is accordingly increased as compared to the motor running at the gear stage not using the one-way clutch as an engaged engagement element. Therefore, the increment of output of the electric motor at the engine start at the gear stage using the one-way clutch as an engaged engagement element can properly be made larger.

The third aspect of the invention provides the control device of a hybrid vehicle recited in the first or second aspect of the invention, wherein when the one-way clutch is released at the time of engagement of the connecting/disconnecting clutch when the engine is started at the gear stage using the one-way clutch as an engaged engagement element, an engagement pressure of the connecting/disconnecting clutch is made smaller when the engine is started next time at the gear stage as compared to previous time. Consequently, the increment of the electric motor torque is more easily made larger than the actual value of the torque capacity of the connecting/disconnecting clutch at the engine start at the gear stage using the one-way clutch as an engaged engagement element, and the synchronization shock of the one-way clutch hardly occurs. Since the increment of the electric motor torque itself is not further enlarged, the electric power consumption is prevented from increasing.

The fourth aspect of the invention provides the control device of a hybrid vehicle recited in the first or second aspect of the invention, wherein when the one-way clutch is released at the time of engagement of the connecting/disconnecting clutch when the engine is started at the gear stage using the one-way clutch as an engaged engagement element, an increment of output of the electric motor is further increased at next engine start at the gear stage as compared to previous time. Consequently, the increment of the electric motor torque is more easily made larger than the actual value of the torque capacity of the connecting/disconnecting clutch at the engine start at the gear stage using the one-way clutch as an engaged engagement element, and the synchronization shock of the one-way clutch hardly occurs.

MODE FOR CARRYING OUT THE INVENTION

In the present invention, preferably, the automatic transmission is made up of a known planetary gear type multistage transmission including a plurality of planetary gear devices and having a plurality of gear stages (shift stages) alternatively formed by engagement operation of engagement elements (engagement devices). The engagement devices widely used are hydraulic friction engagement devices such as multi-plate and single-plate clutches and brakes engaged by a hydraulic actuator or belt-type brakes, and a known one-way clutch. An oil pump supplying operating oil for actuating the hydraulic friction engagement devices may be a pump driven by a drive force source for running to discharge the operating oil, for example, or may be a pump driven by a dedicated electric motor disposed separately from the drive force source for running.

Preferably, an internal combustion engine such as a gasoline engine is widely used for the engine.

Preferably, a wet type or dry type engagement device is used for the connecting/disconnecting clutch.

An example of the present invention will now be described in detail with reference to the drawings.

EXAMPLE

Figure 1:
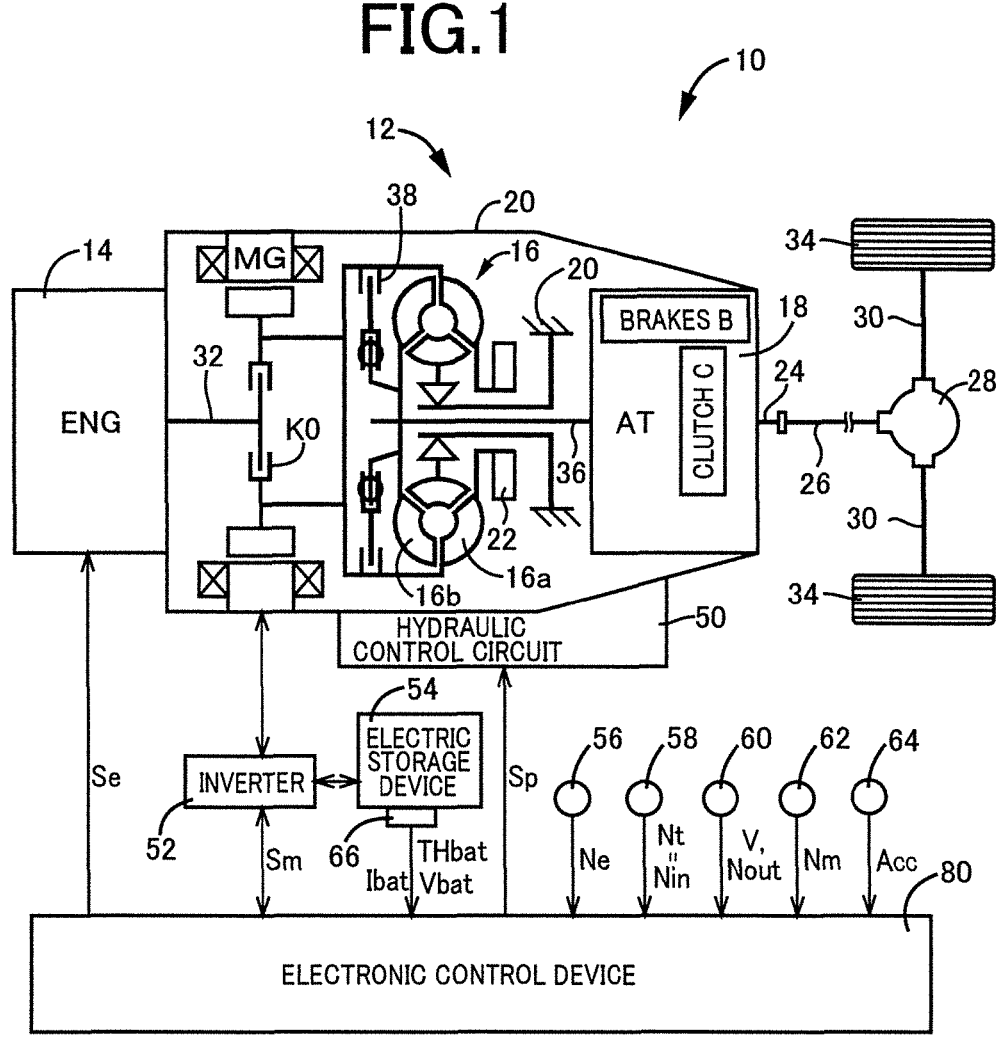
FIG. 1 is a diagram for explaining a general configuration of a power transmission path making up a hybrid vehicle to which the present invention is applied, and is a diagram for explaining a main portion of a control system disposed on the vehicle.

FIG. 1 is a diagram for explaining a general configuration of a power transmission path from an engine 14 to drive wheels 34 making up a hybrid vehicle 10 (hereinafter referred to as a vehicle 10) to which the present invention is applied, and is a diagram for explaining a main portion of a control system disposed on the vehicle 10 for output control of the engine 14 acting as a drive force source for running, shift control of an automatic transmission 18, drive control of an electric motor MG acting as a drive force source for running, etc.

In FIG. 1, a vehicle power transmission device 12 (hereinafter referred to as a power transmission device 12) includes in a transaxle case 20 (hereinafter referred to as a case 20) acting as a non-rotating member, in order from the engine 14 side, an engine connecting/disconnecting clutch K0, the electric motor MG, a torque converter 16, an oil pump 22, and an automatic transmission 18. The power transmission device 12 also includes a propeller shaft 26 coupled to a transmission output shaft 24 that is an output rotating member of the automatic transmission 18, a differential gear device (differential gear) 28 coupled to the propeller shaft 26, a pair of axles 30 coupled to the differential gear device 28, etc. The power transmission device 12 configured as described above is preferably used in the vehicle 10 of the FR (front-engine rear-drive) type, for example. In the power transmission device 12, if the engine connecting/disconnecting clutch K0 is engaged, power of the engine 14 is transmitted from an engine coupling shaft 32 coupling the engine 14 and the engine connecting/disconnecting clutch K0, sequentially through the engine connecting/disconnecting clutch K0, the torque converter 16, the automatic transmission 18, the propeller shaft 26, the differential gear device 28, the pair of the axles 30, etc., to a pair of the drive wheels 34.

The torque converter 16 is a fluid transmission device transmitting a drive force (having the same meaning as a drive torque if not particularly distinguished) input to a pump impeller 16a, from a turbine impeller 16b coupled to a transmission input shaft 36 via fluid toward the automatic transmission 18. The torque converter 16 includes a lockup clutch 38 directly coupling the pump impeller 16a and the turbine impeller 16b. The pump impeller 16a is coupled to the oil pump 22. The oil pump 22 is a mechanical oil pump rotationally driven by the engine 14 (or the electric motor MG) to generate an operating oil pressure for providing the shift control of the automatic transmission 18 and controlling engagement/release of the engine connecting/disconnecting clutch K0.

The electric motor MG is a so-called motor generator having a function of a motor generating a mechanical drive force from electric energy and a function of an electric generator generating electric energy from mechanical energy. In other words, the electric motor MG may act as a drive force source for running generating a drive force for running instead of the engine 14 that is a power source or along with the engine 14. The electric motor MG also performs operations such as generating electric energy through regeneration from a drive force generated by the engine 14 or a driven force (mechanical energy) input from a side of the drive wheels 34 to accumulate the electric energy via an inverter 52 into an electric storage device 54. The electric motor MG is coupled to a power transmission path between the engine connecting/disconnecting clutch K0 and the torque converter 16 (i.e., operatively coupled to the pump impeller 16a) and power is mutually transmitted between the electric motor MG and the pump impeller 16a. Therefore, the electric motor MG is coupled to the transmission input shaft 36 that is an input rotating member of the automatic transmission 18 in a power transmittable manner as is the case with the engine 14.

The engine connecting/disconnecting clutch K0 is a wet multi-plate type hydraulic friction engagement device in which a plurality of friction plates overlapped with each other are pressed by a hydraulic actuator, for example, and is subjected to engagement/release control by a hydraulic control circuit 50 disposed in the power transmission device 12 by using an oil pressure generated by the oil pump 22 as an original pressure. In the engagement/release control, a torque capacity of the engine connecting/disconnecting clutch K0 is varied, for example, continuously, through pressure adjustment of a linear solenoid valve etc., in the hydraulic control circuit 50. The engine connecting/disconnecting clutch K0 includes a pair of clutch rotating members (a clutch hub and a clutch drum) relatively rotatable in the released state thereof and one of the clutch rotating members (the clutch hub) is relatively non-rotatably coupled to the engine coupling shaft 32 while the other clutch rotating member (the clutch drum) is relatively non-rotatably coupled to the pump impeller 16a of the torque converter 16. Because of such a configuration, the engine connecting/disconnecting clutch K0 rotates the pump impeller 16a integrally with the engine 14 via the engine coupling shaft 32 in the engaged state. Therefore, in the engaged state of the engine connecting/disconnecting clutch K0, the drive force from the engine 14 is input to the pump impeller 16a. On the other hand, in the released state of the engine connecting/disconnecting clutch K0, power transmission between the pump impeller 16a and the engine 14 is interrupted. As described above, since the electric motor MG is operatively coupled to the pump impeller 16a, the engine connecting/disconnecting clutch K0 obviously acts as a clutch connecting/disconnecting a power transmission path between the engine 14 and the torque converter 16 and also acts as a connecting/disconnecting clutch connecting/disconnecting a power transmission path between the engine 14 and the electric motor MG.

Figures 2, 3:
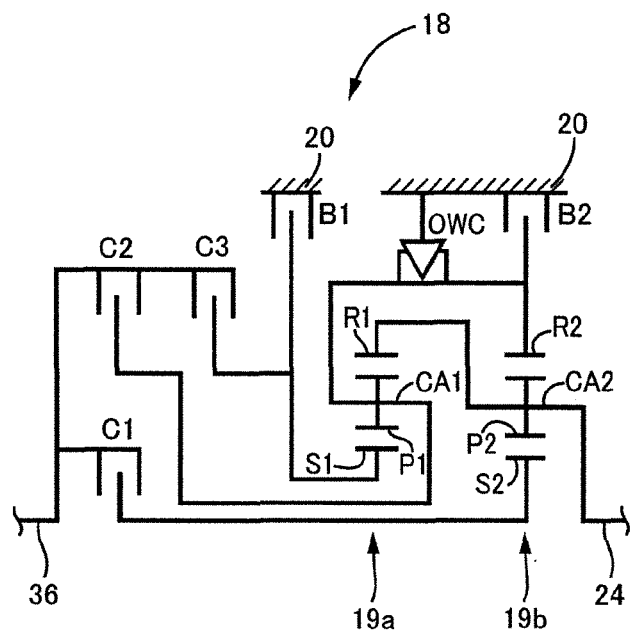
FIG. 2 is a schematic for explaining a general configuration of an automatic transmission.
FIG. 3 is an engagement operation table for establishing gear stages of an automatic transmission.

The automatic transmission 18 is coupled to the electric motor MG without via the engine connecting/disconnecting clutch K0 in a power transmittable manner and makes up a portion of a power transmission path between the electric motor MG and the drive wheels 34 to transmit the power from the drive force source for running (the engine 14 and the electric motor MG) toward the drive wheels 34. Specifically, as depicted in FIG. 2, the automatic transmission 18 is a known planetary-gear type multistage transmission including a first planetary gear device 19a, a second planetary gear device 19b, and a plurality of engagement elements (engagement devices). The first planetary gear device 19a includes a first ring gear R1, a first carrier gear CA1, a first pinion gear P1, and a sun gear S1, and the second planetary gear device 19b includes a second ring gear R2, a second carrier gear CA2, a second pinion gear P2, and a second sun gear S2. The plurality of the engagement devices are known hydraulic friction engagement devices C1, C2, C3 (referred to as clutches C if not particularly distinguished), hydraulic friction engagement devices B1, B2 (referred to as brakes B if not particularly distinguished), and a one-way clutch OWC. In the automatic transmission 18, each of the hydraulic friction engagement devices is engaged or released by operating oil from the hydraulic control circuit 50 in accordance with a predetermined engagement operation table depicted in FIG. 3 so as to achieve a gear stage determined from a known relationship (shift diagram, shift map) having upshift lines and downshift lines defined and stored in advance, for example. As a result, a plurality of gear stages (shift stages) having respective different gear ratios $\gamma$ (=transmission input rotation speed Nin/transmission output rotation speed Nout) of the automatic transmission 18 is established in an alternative manner depending on a driver's accelerator operation, a vehicle speed V, etc. In FIG. 3, a "circle" indicates an engaged state and a blank indicates a released state. As depicted in FIG. 3, a first speed gear stage (1st) is a gear stage established by a first clutch C1 and the one-way clutch OWC and is a gear stage formed by using at least the one-way clutch OWC as an engagement device (hereinafter referred to as an OWC gear stage). A second speed gear stage (2nd) to a fourth speed gear stage (4th) are gear stages different from the OWC gear stage and are gear stages formed without using the one-way clutch OWC as an engagement device (hereinafter referred to as non-OWC gear stages). As described above, the automatic transmission 18 is an automatic transmission having a plurality of the gear stages including the OWC gear stage formed in an alternative manner.

The torque capacities of the engine connecting/disconnecting clutch K0, the clutches C, the brakes B, etc. are determined by a friction coefficient of friction material of the hydraulic friction engagement devices and an engagement oil pressure pressing friction plates, for example, and correspond to transmission torques enabling the engagement devices to transmit power. For example, the torque capacity of the engine connecting/disconnecting clutch K0 corresponds to a K0 transmission torque Tk enabling the engine connecting/disconnecting clutch K0 to transmit power. The friction coefficient of the friction material is not a constant value and varies depending on an operating oil temperature and a differential rotation speed of an engagement device itself. Therefore, the torque capacity and the engagement oil pressure of the engagement device do not necessarily correspond to each other one-to-one due to a delay in a rise of the friction coefficient relative to a rise of the engagement oil pressure etc.;

however, in this example, the torque capacity of the engagement device and the engagement oil pressure may be treated as synonyms for convenience.

Returning to FIG. 1, the vehicle 10 includes an electronic control device 80 including a control device of the vehicle 10 related to hybrid drive control, for example. The electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 80 provides the output control of the engine 14, the drive control of the electric motor MG including regenerative control of the electric motor MG, the shift control of the automatic transmission 18, torque capacity control of the engine connecting/disconnecting clutch K0, etc., and is configured separately as needed for the engine control, the electric motor control, the hydraulic control, etc. The electronic control device 80 is supplied with each of various signals (e.g., an engine rotation speed Ne that is a rotation speed of the engine 14, a turbine rotation speed Nt, i.e., a transmission input rotation speed Nin that is a rotation speed of the transmission input shaft 36, a transmission output rotation speed Nout that is a rotation speed of the transmission output shaft 24 corresponding to the vehicle speed V, an electric motor rotation speed Nm that is a rotation speed of the electric motor MG, an accelerator opening degree Acc corresponding to a drive request amount to the vehicle 10 from a driver, a battery temperature THbat, a battery input/output current (a battery charging/discharging current) that, and a battery voltage Vbat of the electric storage device 54) detected by various sensors (e.g., an engine rotation speed sensor 56, a turbine rotation speed sensor 58, an output shaft rotation speed sensor 60, an electric motor rotation speed sensor 62, an accelerator opening degree sensor 64, and a battery sensor 66). The electronic control device 80 outputs, for example, an engine output control command signal Se for the output control of the engine 14, an electric motor control command signal Sm for controlling the operation of the electric motor MG, and an oil pressure command signal Sp for actuating an electric magnetic valve (solenoid valve) etc. included in the hydraulic control circuit 50 for controlling hydraulic actuators of the engine connecting/disconnecting clutch K0 and the clutches C and the brakes B of the automatic transmission 18, to engine control devices such as a throttle actuator and a fuel supply device, the inverter 52, and the hydraulic control circuit 50, respectively. The electronic control device 80 sequentially calculates a state of charge (charging capacity) SOC of the electric storage device 54 based on the battery temperature THbat, the battery charging/discharging current that, and the battery voltage Vbat, for example.

Figure 4:
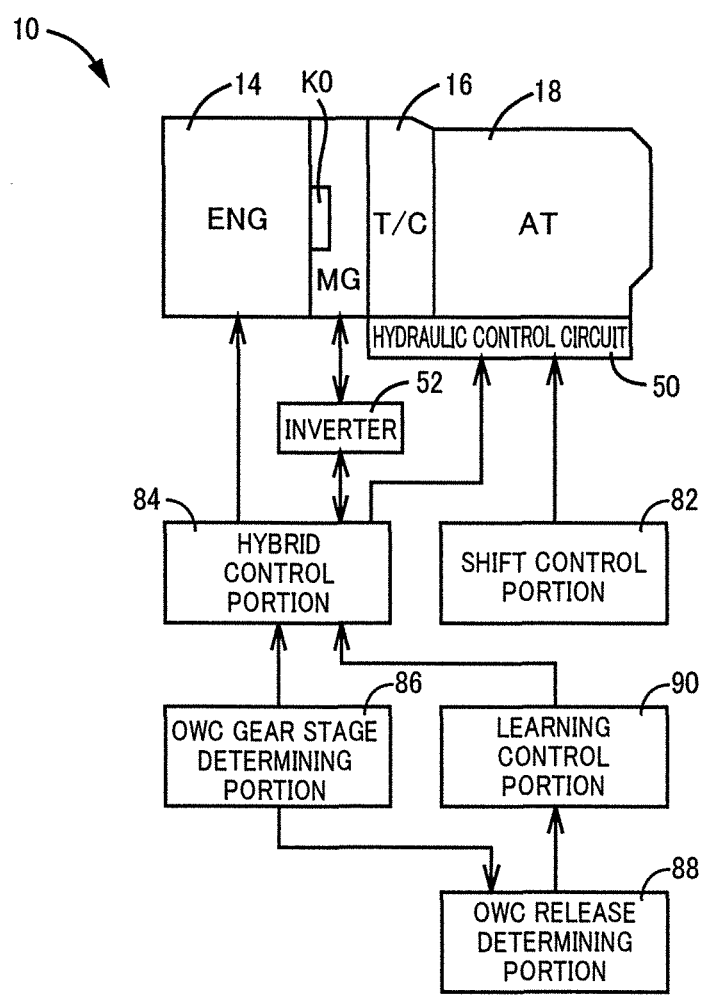
FIG. 4 is a functional block diagram for explaining a main portion of a control function of an electronic control device.

FIG. 4 is a functional block diagram for explaining a main portion of the control function of the electronic control device 80. In FIG. 4, a shift control means, i.e., a shift control portion 82, determines whether a shift of the automatic transmission 18 should be performed, i.e., determines a gear stage to be achieved by the automatic transmission 18, based on a vehicle state such as an actual vehicle speed V and an accelerator opening degree Acc from a shift map stored in advance by using the vehicle speed V and the accelerator opening degree Acc (or the transmission output torque Tout etc.) as variables, for example, and provides the automatic shift control of the automatic transmission 18 such that the determined gear stage is acquired.

A hybrid control means, i.e., a hybrid control portion 84, has a function as an engine drive control portion controlling drive of the engine 14 and a function as an electric motor operation control portion controlling the operations of the electric motor MG as a drive force source or an electric generator through the inverter 52, and provides control of the hybrid drive by the engine 14 and the electric motor MG through these control functions. For example, the hybrid control portion 84 calculates a request drive torque Touttgt as a drive request amount (i.e. a driver request amount) to the vehicle 10 based on the accelerator opening degree Acc and the vehicle speed V and controls the drive force source for running so as to achieve the output torque of the drive force source for running (the engine 14 and the electric motor MG) such that the request drive torque Touttgt is acquired in consideration of a transmission loss, an accessory load, a gear stage of the automatic transmission 18, the charge capacity SOC of the electric storage device 54, etc. The drive request amount can be implemented by using not only the request drive torque Touttgt at the drive wheels 34 but also a request drive force at the drive wheels 34, a request drive power at the drive wheels 34, a request transmission output torque at the transmission output shaft 24, a request transmission input torque at the transmission input shaft 36, a target toque of the drive force source for running (the engine 14 and the electric motor MG), etc. The drive request amount can be implemented by simply using the accelerator opening degree Acc, a throttle valve opening degree, an intake air amount, etc.

More specifically, if the drive request amount is within a range that can be covered solely by an output (having the same meaning as force, torque, etc., if not particularly distinguished) of the electric motor MG, for example, if the request drive torque Touttgt is within a range that can be covered solely by an output torque (electric motor torque) Tm of the electric motor MG, if the vehicle speed V is equal to or less than an EV upper limit vehicle speed defined in advance as an upper limit vehicle speed at which motor running can be performed, and if the charge capacity SOC is equal to or greater than an EV permission capacity defined in advance as a lower limit charge capacity at which the motor running can be performed, the hybrid control portion 84 sets a running mode to a motor running mode (hereinafter, EV mode) and performs the motor running (EV running) for running with only the electric motor MG used as the drive force source for running. On the other hand, if the drive request amount is within a range that cannot be covered unless an output of the engine 14 is used, for example, if the request drive torque Touttgt is within a range that cannot be covered unless at least an output torque (engine torque) Te of the engine 14 is used, if the vehicle speed V exceeds the EV upper limit vehicle speed, or if the charge capacity SOC is less than the EV permission capacity, the hybrid control portion 84 sets the running mode to an engine running mode, i.e., a hybrid running mode (hereinafter, EHV mode), and performs engine running, i.e., hybrid running (EHV running), for running with at least the engine 14 used as the drive force source for running.

Figure 5:
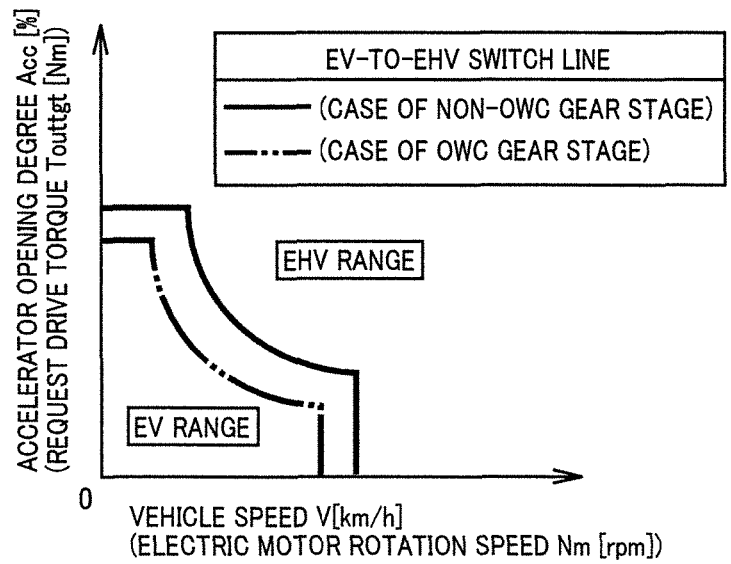
FIG. 5 is a diagram for depicting an example of a relationship (EV/EHV range map) having an EV-EHV switch line defined and stored in advance.

FIG. 5 is a diagram of a relationship (EV/EHV range map) having an EV-EHV switch line (a solid line or a dashed-two dotted line) dividing a range into a motor running range (EV range) and an engine running range (EHV range) defined and stored in advance in two-dimensional coordinates using the vehicle speed V and the accelerator opening degree Acc as variables. For example, the hybrid control portion 84 performs the EV running if the vehicle state is within the EV range and the charge capacity SOC is equal to or greater than the EV permission capacity, and performs the EHV running if the vehicle state is within the EHV range or if the charge capacity SOC is less than the EV permission capacity.

Although the EV-EHV switch line in the EV/EHV range map of FIG. 5 is represented as a line for convenience, the line is a series of points represented by a vehicle state (e.g., the vehicle speed V and the accelerator opening degree Acc) in terms of control. The EV-EHV switch line desirably includes an EV-to-EHV switch line at the time of a transition from the EV range to the EHV range and an EHV-to-EV switch line at the time of a transition from the EHV range to the EV range so that hysteresis is included. Both the solid line and the dashed-two dotted line of FIG. 5 are exemplarily illustrated as the EV-to-EHV switch lines.

If the EV running is performed, the hybrid control portion 84 releases the engine connecting/disconnecting clutch K0 to interrupt the power transmission path between the engine 14 and the torque converter 16 and causes the electric motor MG to output the electric motor torque Tm required for the EV running. On the other hand, if the EHV running is performed, the hybrid control portion 84 engages the engine connecting/disconnecting clutch K0 to connect the power transmission path between the engine 14 and the torque converter 16 and causes the engine 14 to output the engine torque Te required for the EHV running while causing the electric motor MG to output an assist torque as needed.

If a transition of the vehicle state is made from the EV range to the EHV range, or if the charge capacity SOC becomes less than the EV permission capacity, during the EV running, the hybrid control portion 84 switches the running mode from the EV mode to the EHV mode, determines the initiation of a start of the engine 14, and starts the engine 14 to perform the EHV running. In a method of starting the engine 14 by the hybrid control portion 84, for example, the engine is started while the engine connecting/disconnecting clutch K0 is controlled toward engagement (from another viewpoint, while the engine 14 is rotationally driven by the electric motor MG).

In the method of starting the engine 14, an engine start torque Tms is required that is a torque necessary for starting the engine. The engine start torque Tms required for a prompt engine start is a torque corresponding to a total torque of a friction torque of the engine 14 (a compression torque corresponding to pumping loss+a mechanical friction torque corresponding to sliding friction) and engine inertia, for example. To improve acceleration responsiveness, the engine start torque Tms may be made larger when a target value of the engine torque Te after engagement of the engine connecting/disconnecting clutch K0 or a target value of the engine rotation speed Ne becomes larger in accordance with the drive request amount. The engine start torque Tms corresponds to an electric motor torque Tm going through the connecting/disconnecting clutch K0 toward the engine 14.

Therefore, when determining the initiation of the start of the engine 14, the hybrid control portion 84 outputs a command value (K0 clutch pressure command value) of an engagement oil pressure (K0 clutch pressure) of the engine connecting/disconnecting clutch K0 so as to acquire the K0 transmission torque Tk for transmitting the required engine start torque Tms toward the engine 14, thereby raising the engine rotation speed Ne. When it is determined that the engine rotation speed Ne is raised to a predetermined rotation speed enabling a complete explosion, the hybrid control portion 84 starts the engine 14 by initiating engine ignition, fuel supply, etc. When it is determined that the engine rotation speed Ne is increased to and synchronized with the electric motor rotation speed Nm by a self-sustaining operation of the engine 14 after the engine start, the hybrid control portion 84 outputs the K0 clutch pressure command value (e.g., a maximum K0 clutch pressure command value corresponding to the maximum value of the K0 clutch pressure) so as to acquire the K0 transmission torque Tk for properly transmitting the engine torque Te toward the drive wheels 34 (e.g., to acquire a final K0 transmission torque Tk for completely engaging the engine connecting/disconnecting clutch K0).

At the start of the engine 14 (at the engine start), the hybrid control portion 84 calculates an estimated value (estimated K0 transmission torque Tkes) of the K0 transmission torque Tk based on the K0 clutch pressure command value at the time from a predetermined relationship defined in advance between the K0 clutch pressure command value and the K0 transmission torque Tk. At the engine start, the hybrid control portion 84 outputs to the inverter 52 a command for increasing the electric motor torque Tm by magnitude corresponding to the estimated K0 transmission torque Tkes so as to maintain the electric motor torque Tm corresponding to the request drive torque Touttgt, i.e., the electric motor torque Tm going toward the drive wheels 34 (hereinafter referred to as an EV power running torque). As a result, the electric motor torque Tm necessary as the engine start torque Tms is output as an increment of the electric motor torque Tm at the engine start (hereinafter referred to as an MG torque compensation amount) in addition to the EV power running torque required for satisfying the request drive torque Touttgt, for example.

The MG torque compensation amount desirably corresponds to the estimated K0 transmission torque Tkes in terms of suppression of electric power consumption at the engine start. A slight gap may be generated between an actual value of the K0 transmission torque Tk (actual K0 transmission torque Tk) and the estimated K0 transmission torque Tkes. Therefore, the MG torque compensation amount may become smaller than the actual K0 transmission torque Tk at the engine start. As a result, in the case of the engine start at a non-OWC gear stage, a shock may occur due to a drop in a drive torque Tout. On the other hand, the engine start at the OWC gear stage may cause not only the shock due to a drop in a drive torque Tout but also a release of the one-way clutch OWC during the engine start because the vehicle 10 is substantially put into a driven state, and the one-way clutch OWC may be re-engaged during the rise of the engine toque Te after engagement of the engine connecting/disconnecting clutch K0, causing a synchronization shock.

Therefore, to satisfy both suppression of deterioration in fuel efficiency and suppression of a shock, if the gear stage of the automatic transmission 18 is the OWC gear stage when the engine 14 is started during the EV running, the electronic control device 80 of this example makes the MG torque compensation amount at the engine start larger as compared to the case of the non-OWC gear stage. In particular, the MG torque compensation amount at the engine start at the non-OWC gear stage is set to a basic MG torque compensation amount BASE of the magnitude corresponding to the estimated K0 transmission torque Tkes. On the other hand, the MG torque compensation amount at the engine start at the OWC gear stage is set to the MG torque compensation amount acquired by adding an MG torque compensation amount UP ($=\alpha$) to the basic MG torque compensation amount BASE of the magnitude corresponding to the estimated K0 transmission torque Tkes. The MG torque compensation amount UP is an additional torque a obtained and stored in advance for certainly making the MG torque compensation amount larger than the actual K0 transmission torque Tk so as not to release the one-way clutch OWC during the engine start even if a gap is generated between the actual K0 transmission torque Tk and the estimated K0 transmission torque Tkes at the engine start at the OWC gear stage, for example.

Since the method of starting the engine 14 of this example requires the engine start torque Tms, the EV running is desirably performed with reserve power left for the engine start torque Tms in preparation for the engine start. Therefore, the EV range is desirably defined as a range that can be supported by a torque equal to or less than the torque acquired by subtracting the engine start torque Tms from a maximum electric motor torque Tmmax that can be output by the electric motor MG at a certain time point during the EV running. Thus, at the OWC gear stage, the EV running is desirably performed with reserve power left for the torque acquired by adding the MG torque compensation amount UP to the engine start torque Tms in preparation for the engine start. Therefore, the electronic control device 80 of this example makes the EV range smaller during running at the OWC gear stage as compared to running at the non-OWC gear stage. For example, the solid line of FIG. 5 is the EV-to-EHV switch line set during the EV running at the non-OWC gear stage and the dashed-two dotted line of FIG. 5 is the EV-to-EHV switch line set during the EV running at the OWC gear stage. In FIG. 5, the EV-to-EHV switch line indicated by the dashed-two dotted line has the EV range made smaller as compared to the EV-to-EHV switch line indicated by the solid line. The electronic control device 80 sets the EV-to-EHV switch line as indicated by, for example, the solid line of FIG. 5 during the EV running at the non-OWC gear stage and sets the EV-to-EHV switch line as indicated by, for example, the dashed-two dotted line of FIG. 5 during the EV running at the OWC gear stage, thereby making the EV range smaller during running at the OWC gear stage as compared to running at the non-OWC gear stage. Changing the EV range is to change the EV-EHV switch line and, when it is assumed that the vehicle speed V is the same, changing the EV range is to change an engine start threshold value (particularly corresponding to the EV-to-EHV switch line) for determining the engine start in relation to the accelerator opening degree Acc.

As described above, the electronic control device 80 of this example sets the MG torque compensation amount acquired by adding the MG torque compensation amount UP to the basic MG torque compensation amount BASE at the engine start at the OWC gear stage so as not to release the one-way clutch OWC during the engine start. However, such setting does not necessarily maintain the engagement of the one-way clutch OWC during the engine start. When the one-way clutch OWC is released during the engine start even with such setting, this is because the actual K0 transmission torque Tk is made larger than the MG torque compensation amount, and the MG torque compensation amount UP itself may further be enlarged or the K0 clutch pressure command value may be lowered to reduce the estimated K0 transmission torque Tkes so that a proportion of the MG torque compensation amount UP is made larger in the MG torque compensation amount (i.e., the actual K0 transmission torque Tk is reduced to increase a degree of influence of the MG torque compensation amount UP). Since further enlarging the MG torque compensation amount UP itself leads to a further increase in electric power consumption, it is more advantageous to lower the K0 clutch pressure command value in terms of fuel efficiency improvement. Therefore, if the one-way clutch OWC is released at the time of engagement of the engine connecting/disconnecting clutch K0 when the engine 14 is started at the OWC gear stage, the electronic control device 80 of this example makes the K0 clutch pressure (i.e., the K0 clutch pressure command value) smaller when the engine 14 is started next time at the OWC gear stage as compared to the previous time.

More specifically, returning to FIG. 4, an OWC gear stage determining means, i.e., an OWC gear stage determining portion 86 determines whether the gear stage of the automatic transmission 18 during the EV running uses the one-way clutch OWC as a reaction force element (i.e., whether the gear stage is the OWC gear stage).

If the OWC gear stage determining portion 86 determines that the gear stage of the automatic transmission 18 during the EV running is not the OWC gear stage (i.e., if it is determined that the gear stage is the non-OWC gear stage), the hybrid control portion 84 sets as the EV-to-EHV switch line the EV-to-EHV switch line as indicated by, for example, the solid line of FIG. 5 with the EV range made relatively larger and directly sets the basic MG torque compensation amount BASE as the MG torque compensation amount. On the other hand, if the OWC gear stage determining portion 86 determines that the gear stage of the automatic transmission 18 during the EV running is the OWC gear stage, the hybrid control portion 84 sets as the EV-to-EHV switch line the EV-to-EHV switch line as indicated by, for example, the dashed-two dotted line of FIG. 5 with the EV range made relatively smaller and sets the MG torque compensation amount acquired by adding the MG torque compensation amount UP to the basic MG torque compensation amount BASE as the MG torque compensation amount.

When the OWC gear stage determining portion 86 determines that the gear stage of the automatic transmission 18 during the EV running is the non-OWC gear stage, if the initiation of the start of the engine 14 is determined, the hybrid control portion 84 outputs to the inverter 52 a command for outputting the electric motor torque Tm of the magnitude acquired by adding the basic MG torque compensation amount BASE to the EV power running torque. On the other hand, when the OWC gear stage determining portion 86 determines that the gear stage of the automatic transmission 18 during the EV running is the OWC gear stage, if the initiation of the start of the engine 14 is determined, the hybrid control portion 84 outputs to the inverter 52 a command for outputting the electric motor torque Tm of the magnitude acquired by adding the basic MG torque compensation amount BASE and the MG torque compensation amount UP to the EV power running torque.

If the OWC gear stage determining portion 86 determines that the gear stage of the automatic transmission 18 during the EV running is the OWC gear stage, an OWC release determining means, i.e., an OWC release determining portion 88 determines whether the one-way clutch OWC is released at the time of engagement of the engine connecting/disconnecting clutch K0 when the engine 14 is started by the hybrid control portion 84. The OWC release determining portion 88 determines whether the one-way clutch OWC is released, for example, based on whether an actual value of the turbine rotation speed Nt (transmission input rotation speed Nin) is reduced by a release determination value obtained in advance or more relative to a calculation value of the turbine rotation speed Nt (=transmission output rotation speed Nout×gear ratio γowc of the automatic transmission 18 at the OWC gear stage) when it is assumed that the one-way clutch OWC is engaged. The time of engagement of the engine connecting/disconnecting clutch K0 is, for example, a time point when the electronic control device 80 determines that the engine rotation speed Ne and the electric motor rotation speed Nm are synchronized after the initiation of the start of the engine 14 by the hybrid control portion 84 and the hybrid control portion 84 outputs the maximum K0 clutch pressure command value. Alternatively, the time of engagement of the engine connecting/disconnecting clutch K0 may be a time point when the electronic control device 80 determines that the engine rotation speed Ne and the electric motor rotation speed Nm are synchronized. The electronic control device 80 determines whether the engine rotation speed Ne and the electric motor rotation speed Nm are synchronized, for example, based on whether a differential rotation speed between the engine rotation speed Ne and the electric motor rotation speed Nm falls within a synchronization determination value obtained in advance.

If the OWC release determining portion 88 determines that the one-way clutch OWC is released at the time of engagement of the engine connecting/disconnecting clutch K0 when the engine 14 is started, a learning control means, i.e., a learning control portion 90 lowers a current reduction amount used for subtraction from the K0 clutch pressure command value when the engine 14 is started by the hybrid control portion 84 at the OWC gear stage, by a constant value obtained and stored in advance, thereby updating the reduction amount. For example, the reduction amount is stored in advance as an initial value of zero in an electrically writable/erasable memory such as an EEPROM and is reduced for update by a constant value each time it is determined that the one-way clutch OWC is released on the condition that a minimum K0 clutch pressure command value can be assured that is obtained in advance as a K0 clutch pressure command value at which the engine start can be performed. As a result, when starting the engine 14 next time at the OWC gear stage, the hybrid control portion 84 uses the reduction amount of the K0 clutch pressure command value made smaller by the constant value than the previous time to set the K0 clutch pressure command value.

Figure 6:
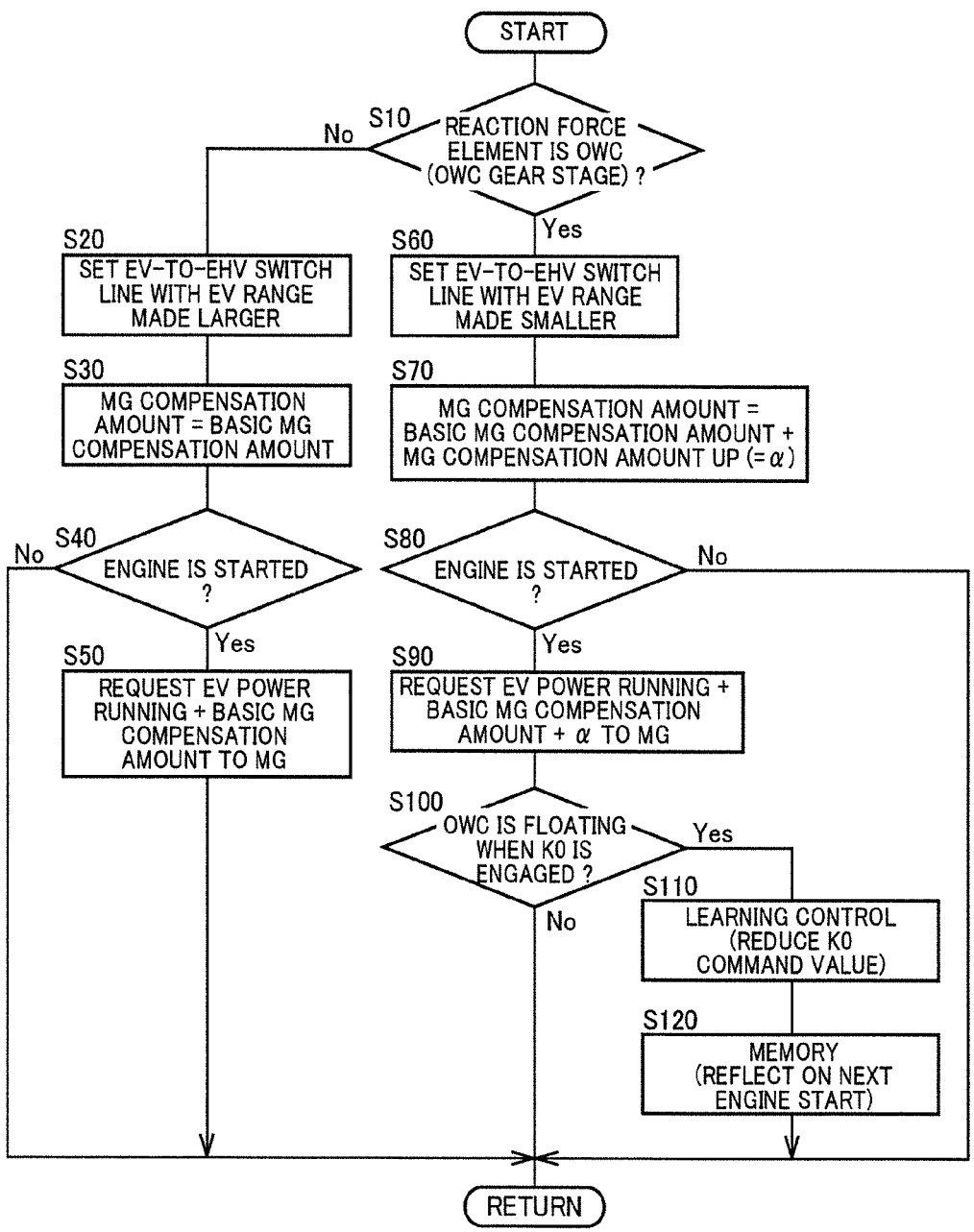
FIG. 6 is a flowchart for explaining a main portion of a control operation of the electronic control device, i.e., a control operation for satisfying both the suppression of deterioration in fuel efficiency and the suppression of a shock at the time of the engine start.
Figure 7:
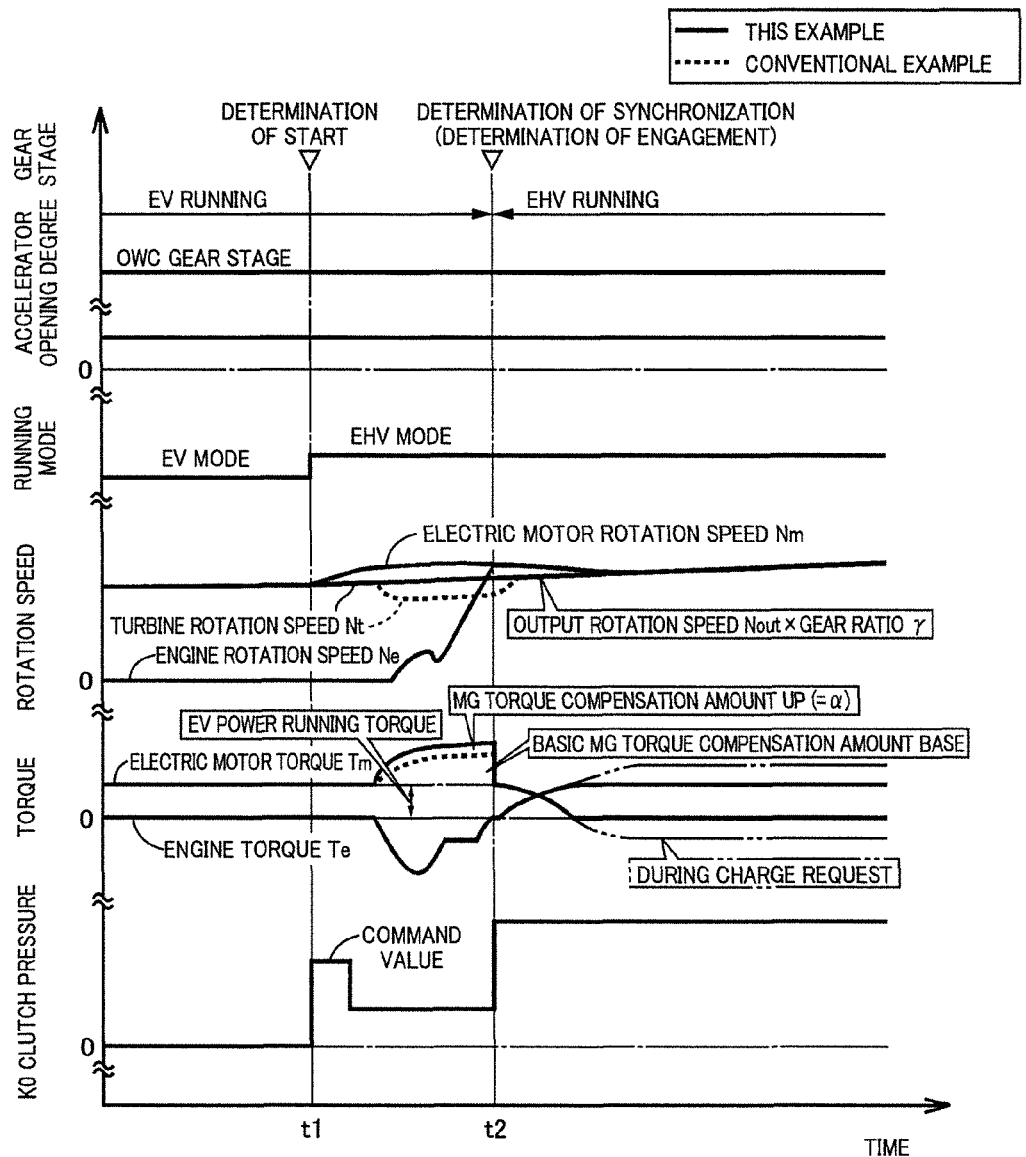
FIG. 7 is a time chart when the control operation depicted in the flowchart of FIG. 6 is executed.

FIG. 6 is a flowchart for explaining a main portion of the control operation of the electronic control device 80, i.e., the control operation for satisfying both the suppression of deterioration in fuel efficiency and the suppression of a shock at the time of the engine start, and is repeatedly executed with an extremely short cycle time, for example, on the order of a few msec to a few tens of msec. The flowchart of FIG. 6 is executed during the EV running, for example. FIG. 7 is a time chart when the control operation depicted in the flowchart of FIG. 6 is executed.

In FIG. 6, first, at step (hereinafter, "step" will be omitted) S10 corresponding to the OWC gear stage determining portion 86, it is determined whether the gear stage of the automatic transmission 18 during, for example, the EV running uses the one-way clutch OWC as a reaction force element (i.e., whether the gear stage is the OWC gear stage). If the determination of S10 is negative, at S20 corresponding to the hybrid control portion 84, the EV-to-EHV switch line as indicated by, for example, the solid line of FIG. 5 is set with the EV range made relatively larger. At S30 corresponding to the hybrid control portion 84, the basic MG torque compensation amount BASE is directly set as the MG torque compensation amount. At S40 corresponding to the hybrid control portion 84, the initiation of the start of the engine 14 is determined based on, for example, whether a transition of the vehicle state is made from the EV range to the EHV range or whether the charge capacity SOC becomes less than the EV permission capacity. If the determination of S40 is negative, this routine is terminated and, if affirmative, at S50 corresponding to the hybrid control portion 84, the K0 clutch pressure command value is output to the hydraulic control circuit 50 for the engine start and the command is output to the inverter 52 for outputting the electric motor torque Tm of the magnitude acquired by adding the basic MG torque compensation amount BASE to the EV power running torque. On the other hand, if the determination of S10 is affirmative, at S60 corresponding to the hybrid control portion 84, the EV-to-EHV switch line as indicated by, for example, the dashed-two dotted line of FIG. 5 is set with the EV range made relatively smaller (before time t1 of FIG. 7). At S70 corresponding to the hybrid control portion 84, the MG torque compensation amount is set that is acquired by adding the MG torque compensation amount UP (=α) to the basic MG torque compensation amount BASE. At S80 corresponding to the hybrid control portion 84, the initiation of the start of the engine 14 is determined based on, for example, whether a transition of the vehicle state is made from the EV range to the EHV range or whether the charge capacity SOC becomes less than the EV permission capacity. If the determination of S80 is negative, this routine is terminated and, if affirmative, at S90 corresponding to the hybrid control portion 84, the K0 clutch pressure command value is output to the hydraulic control circuit 50 for the engine start and the command is output to the inverter 52 for outputting the electric motor torque Tm of the magnitude acquired by adding the basic MG torque compensation amount BASE and the MG torque compensation amount UP to the EV power running torque (between time t1 and time t2 of FIG. 7). At S100 corresponding to the OWC release determining portion 88, it is determined whether the one-way clutch OWC is released at the time of engagement of the engine connecting/disconnecting clutch K0, for example (at time t2 of FIG. 7). If the determination of S100 is negative, this routine is terminated and, if affirmative, at S110 and S120 corresponding to the learning control portion 90, a learning value stored in a memory, i.e., the reduction amount for subtraction from the K0 clutch pressure command value at the engine start at the OWC gear stage, is lowered by a predetermined constant value and the learning value (reduction amount) is updated. The reduction amount is used at the time of the next engine start at the OWC gear stage.

The time chart of FIG. 7 depicts an example when the engine 14 is started because the charge capacity SOC decreases during the EV running at the OWC gear stage, for example. In FIG. 7, in a conventional example indicted by a broken line, the electric motor torque Tm is output that is acquired by increasing the EV power running torque by the MG torque compensation amount corresponding only to the basic MG torque compensation amount BASE at the engine start. Therefore, if a gap between the actual K0 transmission torque Tk and the estimated K0 transmission torque Tkes is relatively large, the one-way clutch OWC may be released at the time of the engine start as indicated by the broken line, and the one-way clutch OWC may be re-engaged after engagement of the engine connecting/disconnecting clutch K0, causing a synchronization shock. In contrast, in this example indicated by a solid line, the electric motor torque Tm is output that is acquired by increasing the EV power running torque by the MG torque compensation amount acquired by adding the MG torque compensation amount UP (=α) to the basic MG torque compensation amount BASE at the engine start. As a result, even if a gap between the actual K0 transmission torque Tk and the estimated K0 transmission torque Tkes is relatively large, the engagement of the one-way clutch OWC is maintained at the time of the engine start as indicated by the solid line, and the synchronization shock of the one-way clutch OWC is avoided after the engagement of the engine connecting/disconnecting clutch K0. A dashed-two dotted line of FIG. 7 indicates an example when the regeneration (electric generation) by the electric motor MG is performed because a charge request to the electric storage device 54 is made.

As described above, according to this example, although if the MG torque compensation amount at the engine start is made larger during the EV running at all the gear stages, an increase in electric power consumption deteriorates fuel efficiency, the MG torque compensation amount at the engine start is made larger only at the gear stage at which the MG torque compensation amount really needs to be made larger (i.e., only at the OWC gear stage at which a shock associated with the engine start tends to increase) as compared to the non-OWC gear stage so as to suppress or prevent the release of the one-way clutch OWC, thereby satisfying both the suppression of deterioration in fuel efficiency and the suppression of a shock at the time of the engine start.

According to this example, the EV range is made smaller during running at the OWC gear stage as compared to the running at the non-OWC gear stage. As a result, during the EV running at the OWC gear stage, the power usable for vehicle drive is made smaller in the power that can be output by the electric motor MG and the power usable for the engine start is accordingly increased as compared to the EV running at the non-OWC gear stage. Therefore, the MG torque compensation amount at the engine start at the OWC gear stage can properly be made larger.

According to this example, if the one-way clutch OWC is released at the time of engagement of the engine connecting/disconnecting clutch K0 when the engine 14 is started at the OWC gear stage, the K0 clutch pressure command value is made smaller when the engine 14 is started next time at the OWC gear stage as compared to the previous time. As a result, the MG torque compensation amount is more easily made larger than the actual K0 transmission torque Tk at the engine start at the OWC gear stage, and the synchronization shock of the one-way clutch OWC hardly occurs. Since the MG torque compensation amount (particularly, the MG torque compensation amount UP) itself is not further enlarged, the electric power consumption is prevented from increasing.

Although the example of the present invention has been described in detail with reference to the drawings, the present invention is applied in other forms.

For example, instead of the example, if the one-way clutch OWC is released at the time of engagement of the engine connecting/disconnecting clutch K0 when the engine 14 is started at the OWC gear stage, the MG torque compensation amount (particularly, the MG torque compensation amount UP) itself can be made larger at the next engine start at the OWC gear stage as compared to the previous time. Although this may be disadvantageous in terms of fuel efficiency as compared to the example, certain effects can be acquired that the MG torque compensation amount is more easily made larger than the actual K0 transmission torque Tk at the engine start at the OWC gear stage and that the synchronization shock of the one-way clutch OWC hardly occurs.

Although the present invention is described by exemplarily illustrating the case of starting the engine 14 because the charge capacity SOC decreases during the EV running at the OWC gear stage in FIG. 7 in the example, this is not a limitation. The present invention may be applied to the case of starting the engine 14 because a transition of the vehicle state is made from the EV range to the EHV range in association with an increase in the accelerator opening degree Acc during the EV running at the OWC gear stage, for example.

Although the present invention is described by exemplarily illustrating the case of starting the engine 14 in the state of engagement of the one-way clutch OWC during the EV running at the OWC gear stage in FIG. 7 in the example, this is not a limitation. The present invention may be applied to the case of starting the engine 14 in association with an accelerator turned on during a shift from the non-OWC gear stage to the OWC gear stage during deceleration running with the accelerator turned off, for example. In such a case, the one-way clutch OWC is originally released and the one-way clutch OWC can be engaged before engagement of the engine connecting/disconnecting clutch K0 by adding the MG torque compensation amount UP to make the MG torque compensation amount larger when the engine 14 is started. Therefore, the synchronization shock of the one-way clutch OWC hardly occurs after the engagement of the engine connecting/disconnecting clutch K0 (i.e., immediately after the engine start). In this case, the larger MG torque compensation amount UP ($=\alpha$) may be set in advance to facilitate the engagement of the one-way clutch OWC as compared to the case that the one-way clutch OWC is engaged. To further facilitate the engagement of the one-way clutch OWC, the MG torque compensation amount UP may be made larger when a release amount ($=Nout \times \gamma - Nt$) during release of the one-way clutch OWC is larger. In this case, to properly ensure the MG torque compensation amount UP, the EV range is made smaller (i.e., the EV-to-EHV switch line is changed toward a side of reducing the EV range) during deceleration running as compared to the case that the one-way clutch OWC is engaged, and the EV range is made smaller when the release amount of the one-way clutch OWC is larger.

Although the lockup clutch 38 is disposed on the torque converter 16 in the example, the lockup clutch 38 may not necessarily be disposed. Although the torque converter 16 is used as the fluid transmission device, the torque converter 16 may not necessarily be disposed and another fluid transmission device such as a fluid coupling without a torque amplification effect may be used instead of the torque converter 16.

The above description is merely an embodiment and the present invention can be implemented in variously modified and improved forms based on the knowledge of those skilled in the art.

NOMENCLATURE OF ELEMENTS

10: hybrid vehicle 14: engine 18: automatic transmission 34: drive wheels 80: electronic control device (control device) K0: engine connecting/disconnecting clutch (connecting/disconnecting clutch) MG: electric motor OWC: one-way clutch

The invention claimed is:

1. A control device of a hybrid vehicle including an engine, an electric motor outputting power for running and power necessary for starting the engine, a connecting/disconnecting clutch connecting/disconnecting a power transmission path between the engine and the electric motor, and an automatic transmission making up a portion of a power transmission path between the electric motor and drive wheels, the automatic transmission having a plurality of gear stages alternatively formed including a gear stage using a one-way clutch as an engaged engagement element, the control device of a hybrid vehicle engaging the connecting/disconnecting clutch to start the engine during motor running for running by using only the electric motor with the connecting/disconnecting clutch released, when a gear stage at the time of starting the engine uses the one-way clutch as an engaged engagement element, an increment of output of the electric motor at the engine start being made larger as compared to when the gear stage does not use the one-way clutch as an engaged engagement element.

2. The control device of a hybrid vehicle of claim 1, wherein during running at the gear stage using the one-way clutch as an engaged engagement element, a range of performing the motor running is made smaller as compared to during running at the gear stage not using the one-way clutch as an engaged engagement element.

3. The control device of a hybrid vehicle of claim 1, wherein when the one-way clutch is released at the time of engagement of the connecting/disconnecting clutch when the engine is started at the gear stage using the one-way clutch as an engaged engagement element, an engagement pressure of the connecting/disconnecting clutch is made smaller when the engine is started next time at the gear stage as compared to previous time.

4. The control device of a hybrid vehicle of claim 2, wherein when the one-way clutch is released at the time of engagement of the connecting/disconnecting clutch when the engine is started at the gear stage using the one-way clutch as an engaged engagement element, an engagement pressure of the connecting/disconnecting clutch is made smaller when the engine is started next time at the gear stage as compared to previous time.

5. The control device of a hybrid vehicle of claim 1, wherein when the one-way clutch is released at the time of engagement of the connecting/disconnecting clutch when the engine is started at the gear stage using the one-way clutch as an engaged engagement element, an increment of output of the electric motor is further increased at next engine start at the gear stage as compared to previous time.

6. The control device of a hybrid vehicle of claim 2, wherein when the one-way clutch is released at the time of engagement of the connecting/disconnecting clutch when the engine is started at the gear stage using the one-way clutch as an engaged engagement element, an increment of output of the electric motor is further increased at next engine start at the gear stage as compared to previous time.

* * * * *